US009774254B2

(12) United States Patent
Chae et al.

(10) Patent No.: US 9,774,254 B2
(45) Date of Patent: Sep. 26, 2017

(54) CONVERTER SYSTEM USING EFFICIENT MAP AND METHOD OF CONTROLLING SAME

(71) Applicant: KOREA INSTITUTE OF ENERGY RESEARCH, Daejeon (KR)

(72) Inventors: Su Yong Chae, Daejeon (KR); Yu Jin Song, Daejeon (KR); Sea Seung Oh, Daejeon (KR); Yoon Dong Sung, Daejeon (KR); Jin Ju Park, Daejeon (KR)

(73) Assignee: KOREA INSTITUTE OF ENERGY RESEARCH (KR)

(*) Notice: Subject to any disclaimer, the term of this patent is extended or adjusted under 35 U.S.C. 154(b) by 514 days.

(21) Appl. No.: 14/525,846

(22) Filed: Oct. 28, 2014

(65) Prior Publication Data

US 2015/0364982 A1 Dec. 17, 2015

(30) Foreign Application Priority Data

Jun. 11, 2014 (KR) ........................ 10-2014-0070659

(51) Int. Cl.
*H02M 3/157* (2006.01)
*H02M 3/158* (2006.01)
*H02M 1/00* (2006.01)

(52) U.S. Cl.
CPC ......... *H02M 3/157* (2013.01); *H02M 3/1584* (2013.01); *H02M 2001/0032* (2013.01); *Y02B 70/16* (2013.01); *Y10T 307/549* (2015.04)

(58) Field of Classification Search
CPC .................................................. H02M 3/157

USPC .......................................................... 307/52
See application file for complete search history.

(56) References Cited

U.S. PATENT DOCUMENTS 6,246,222 B1* 6/2001 Nilles ................. H02M 3/1584
323/283
2013/0285627 A1 10/2013 Chae et al.
2013/0293012 A1 11/2013 Song et al.

FOREIGN PATENT DOCUMENTS

KR 2009-0057439 A 6/2009

* cited by examiner

*Primary Examiner* — Joseph Chang
(74) *Attorney, Agent, or Firm* — Harness, Dickey & Pierce, P.L.C.

(57) ABSTRACT

Provided is a converter system including: a plurality of converter modules connected to one power source in parallel; and a controller for storing mapping information of first parameters corresponding to processing power of the converter modules and second parameters corresponding to the number of converter modules that optimally process the processing power among the converter modules, configuring a value of the first parameter according to a measurement value of power input into the converter modules or power output from the converter modules, calculating a value of the second parameter by substituting the value of the first parameter into the mapping information, selecting the number of converter modules corresponding to the value of the second parameters as active converter modules from the converter modules and processing the processing power by using the active converter modules, and controlling output power of the active converter module to gradually increase or decrease in a transient state where the value of the second parameter is changed.

18 Claims, 16 Drawing Sheets

2

CONVERTER SYSTEM USING EFFICIENT MAP AND METHOD OF CONTROLLING SAME

CROSS-REFERENCE TO RELATED APPLICATION

This application claims priority from and the benefit under 35 U.S.C. §119(a) of Korean Patent Application No. 10-2014-0070659, filed on Jun. 11, 2014, which is hereby incorporated by reference for all purposes as if fully set forth herein.

BACKGROUND OF THE INVENTION

1. Field of the Invention

The present invention relates to a converter system converting power. More particularly, the present invention relates to a converter system technology for operating a plurality of converter modules in parallel with optimum efficiency.

2. Description of the Prior Art

Unlike solar or wind power, fuel cells are representative renewable distributed energy sources of which an output can be controlled according to a user demand characteristic and are widely used as power supply sources of a mobile system such as an unmanned aerial vehicle, an automobile, a submarine and the like at present. Miniaturization and high power of fuel cell stacks applied to the mobile system are very important factors to reduce the weight of the system and improve the efficiency of the system.

Meanwhile, a DC-DC converter is used for efficient power conversion of the high power fuel cell stack. When modules having the same capacity are arranged in parallel in an interleaving type, the DC-DC converter may relatively easily increase processing power and reduce current ripple.

However, such a parallel arrangement type corresponds to a very advantageous structure to the reliability improvement and the increase in processing power, but has disadvantages in that power is easily non-uniformly processed between parallel modules and a high efficiency operation is difficult during entire load operation intervals. Particularly, the mobile system requires as long an operation as possible with limited fuel, and accordingly, loss reduction through the high efficiency of the DC-DC converter is a very important factor.

SUMMARY OF THE INVENTION

Accordingly, an aspect of the present invention is to provide technologies related to a converter system and a method of controlling the same in which a plurality of converter modules operating in parallel operate with the high efficiency during entire load operation intervals.

In accordance with an aspect of the present invention, a converter system is provided. The converter system includes: a plurality of converter modules connected to one power source in parallel; and a controller for storing mapping information of first parameters corresponding to processing power of the converter modules and second parameters corresponding to the number of converter modules that optimally process the processing power among the converter modules, configuring a value of the first parameter according to a measurement value of power input into the converter modules or power output from the converter modules, calculating a value of the second parameter by substituting the value of the first parameter into the mapping information, selecting the number of converter modules corresponding to the value of the second parameters as active converter modules from the converter modules and processing the processing power by using the active converter modules, and controlling output power of the active converter module to gradually increase or decrease in a transient state where the value of the second parameter is changed.

In accordance with another aspect of the present invention, a converter system is provided. The converter system includes: a plurality of converter modules connected to one power source in parallel; and a controller for storing mapping information of first parameters corresponding to processing power of the converter modules and second parameters corresponding to the number of converter modules that optimally process the processing power among the converter modules, configuring a value of the first parameter according to a measurement value of power input into the converter modules or power output from the converter modules, calculating a value of the second parameter by substituting the value of the first parameter into the mapping information, and transmitting a current reference value to the converter modules based on an equation of $$I_{ref\_i}(n) = \begin{cases} e_i(n)\left(I_{ref\_i}(n-1) + \dfrac{\Delta i_r}{\alpha(n)}\right), & \text{if } \alpha(n) = \alpha(n-1) \\ \dfrac{e_i(n)}{\alpha(n)}\left(\sum_{i=1}^{r} I_{ref\_i}(n-1) + \Delta i_r\right), & \text{if } \alpha(n) \neq \alpha(n-1) \end{cases}$$

(n denotes time, i denotes a number of a converter module, Iref_i(n) denotes a current reference value of an ith converter module in time of n, α denotes the number of converter modules to be operated and is determined according to the second parameter, $\Delta i_r$ denotes a difference between an input current and an output current, r denotes the number of total converter modules, and $e_i(n)$ has a value of 1 for a converter module to be operated with an ON value of the $i^{th}$ converter module in time of n).

In accordance with another aspect of the present invention, a converter system connected with a fuel cell is provided. The converter system includes: a plurality of current control type converter modules connected to an output terminal of the fuel cell in parallel; a memory for storing an efficiency map in which first parameters corresponding to processing power of the converter system and second parameters corresponding to the number of converter modules capable of processing the processing power with an optimum efficiency are mapped; a total reference value generator for generating a command-value-for-total-current-reference-value; a module selector for configuring a value of the first parameter according to the command-value-for-total-current-reference-value, calculating a value of the second parameter by substituting the value of the first parameter into the efficiency map, and selecting the number of converter modules corresponding to the value of the second parameter as active converter modules from the converter modules; and a reference value generator for generating a current reference value signal for each of the converter modules, wherein a sum total of current reference values of the converter modules is equal to the command-value-for-total-current-reference-value.

In accordance with another aspect of the present invention, a converter system connected with a fuel cell is provided. The converter system includes: a plurality of current control type converter modules connected to an output terminal of the fuel cell in parallel; a memory for storing an efficiency map in which first parameters corresponding to processing power of the converter system and second parameters corresponding to the number of converter modules capable of processing the processing power with an optimum efficiency are mapped; a module selector for configuring a value of the first parameter according to a sensing value for input power or output power, calculating a value of the second parameter by substituting the value of the first parameter into the efficiency map, selecting the number of converter modules corresponding to the value of the second parameter as active converter modules from the converter modules, and transmitting enable signals; and a reference value generator for generating current reference value signals for some or all of the converter modules; and a filter for filtering the current reference value signals and transmitting the filtered current reference value signals to the converter modules.

In accordance with another aspect of the present invention, a method of controlling a converter system including a plurality of converter modules connected to an output terminal of a fuel cell in parallel is provided. The method includes: loading, to a memory, an efficiency map in which first parameters corresponding to processing power of the converter system and second parameters corresponding to the number of converter modules which can process the processing power with an optimum efficiency are mapped; configuring a value of the first parameter according to a sensing value for input power or output power; calculating a value of the second parameter by substituting the value of the first parameter into the efficiency map, selecting the number of converter modules corresponding to the value of the second parameter as active converter modules from the converter modules, and transmitting enable signals; generating current reference value signals for some or all of the converter modules; filtering the current reference value signals and transmitting the filtered current reference value signals to the converter modules; and controlling currents of the converter modules.

In accordance with another aspect of the present invention, a converter system connected with a fuel cell is provided. The converter system includes: a plurality of current control type converter modules connected to an output terminal of the fuel cell in parallel; a memory for storing an efficiency map in which first parameters corresponding to processing power of the converter system and second parameters corresponding to the number of converter modules capable of processing the processing power with an optimum efficiency; a total reference value generator for generating a command-value-for-total-current-reference-value; a module selector for configuring a value of the first parameter according to the command-value-for-total-current-reference-value, calculating a value of the second parameter by substituting the value of the first parameter into the efficiency map, selecting the number of converter modules corresponding to the value of the second parameter as active converter modules from the converter modules, and transmitting enable signals; and a reference value generator for generating a current reference value signal for each of the converter modules, wherein a sum total of current reference values of the converter modules is equal to the command-value-for-total-current-reference-value.

In accordance with another aspect of the present invention, a method of controlling a converter system including a plurality of converter modules connected to an output terminal of a fuel cell in parallel is provided. The method includes: loading, to a memory, an efficiency map in which first parameters corresponding to processing power of the converter system and second parameters corresponding to the number of converter modules which can process the processing power with an optimum efficiency are mapped; generating a command-value-for-total-current-reference-value; configuring a value of the first parameter according to the command-value-for-total-current-reference-value; calculating a value of the second parameter by substituting the value of the first parameter into the efficiency map, selecting the number of converter modules corresponding to the value of the second parameter as active converter modules from the converter modules, and transmitting enable signals; generating current reference value signals for some or all of the converter modules, limiting a change rate of the current reference value within a preset current reference value change rate range, and controlling a sum total of the current reference values to be equal to the command-value-for-total-current-reference-value.

As described above, according to the present invention, there is an effect in that a plurality of converter modules operating in parallel operate with the high efficiency during entire load operation intervals.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
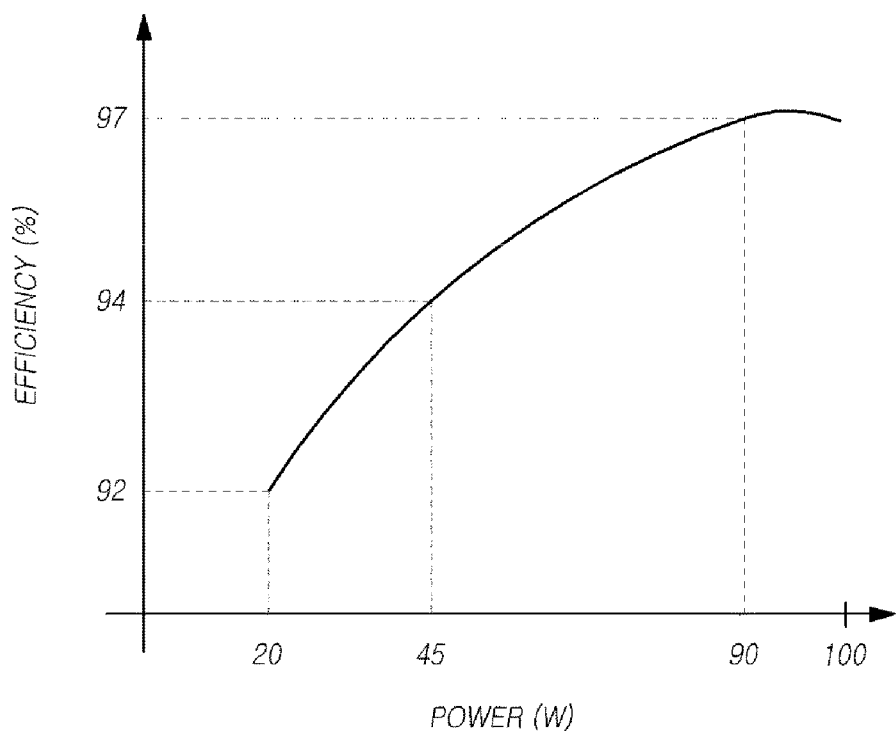
FIG. 1 is an efficiency curved line graph of an example of a converter module.

FIG. 1 is an example of an efficiency curved line graph of a converter module.

Referring to FIG. 1, when a converter module processes power of 90 W, efficiency of the converter module becomes 97%. When the converter module processes power of 45 W, efficiency of the converter module becomes 94%.

It is assumed that a converter system operates, in parallel, two converter modules having such efficiency characteristics.

When the converter system processes power of 90 W through two converter modules in parallel, each of the converter modules process power of 45 W and thus efficiency of the converter system becomes 94%.

In contrast, when the converter system processes power of 90 W through one converter module, the corresponding converter module processes power of 90 W and thus efficiency of the converter system becomes 97%.

Accordingly, processing power of 90 W through one converter module is advantageous to the converter system from an efficiency point of view.

The converter system according to the present invention operates the number of converter modules which creates optimum efficiency according to power throughput to operate with high efficiency during entire load operation intervals.

For example, in the above description, the converter system operates only one converter module without operating both the converter modules to process power of 90 W.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
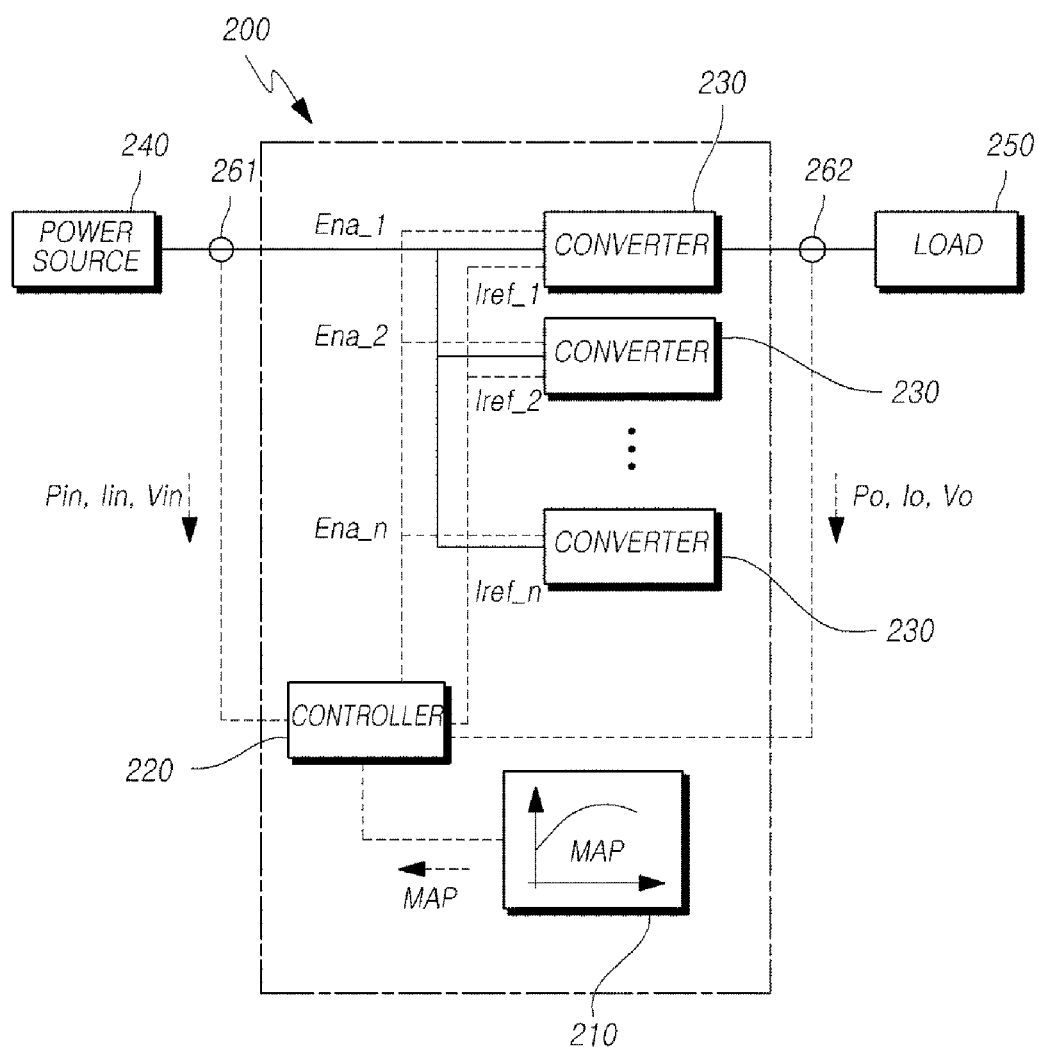
FIG. 2 illustrates a converter system according to an embodiment of the present invention.

FIG. 2 illustrates a converter system according to an embodiment of the present invention.

Referring to FIG. 2, a converter system 200 includes a plurality of converter modules 230.

The plurality of converter modules 230 are connected to each other in parallel. An input terminal of each of the converter modules 230 is connected to a power source 240 and an output terminal of each of the converter modules 230 is connected to a load 250. The converter module 230 converts power supplied from the power source 240 and transmits the converted power to the load 250.

The converter module 230 may have a different form according to the type of power supplied from the power source 240 and the type of power consumed by the load 250. For example, when the power source 240 supplies Alternating Current (AC) power and the load 250 consumes Direct Current (DC) power, the converter module 230 may be a form of an AC-DC converter. Further, when the power source 240 supplies DC power and the load 250 consumes AC power, the converter module 230 may be a form of a DC-AC converter. Hereinafter, although an embodiment in which the converter module 230 has a form of a DC-DC converter will be described for the convenience of the description, the present invention is not limited thereto.

The converter module 230 may be a voltage control type converter or a current control type converter based on a control scheme. The voltage control type converter is a converter which controls an output voltage and an adapter is a representative example of the voltage control type converter. The current control type converter is a converter which controls an output current and a battery charger is a representative example of the current control type converter. Hereinafter, although an embodiment in which the converter module 230 is the current control type converter will be described, the present invention is not limited thereto. Further, since the current control type converter generally includes a function of controlling an output voltage through a voltage feedback loop, the current control type converter should be understood as including a function of the voltage control type converter.

Meanwhile, the converter system 200 may further include a memory 210 and a controller 220.

The memory 210 may store mapping information of first parameters corresponding to processing power of the converter modules or processing power of the converter system 200 and second parameters corresponding to the number of converter modules which optimally process the processing power.

The mapping information may be stored in a form of an efficiency map, and the memory 210 may store an efficiency map indicating the number of converter modules which can process processing power with optimum efficiency.

Figure 3:
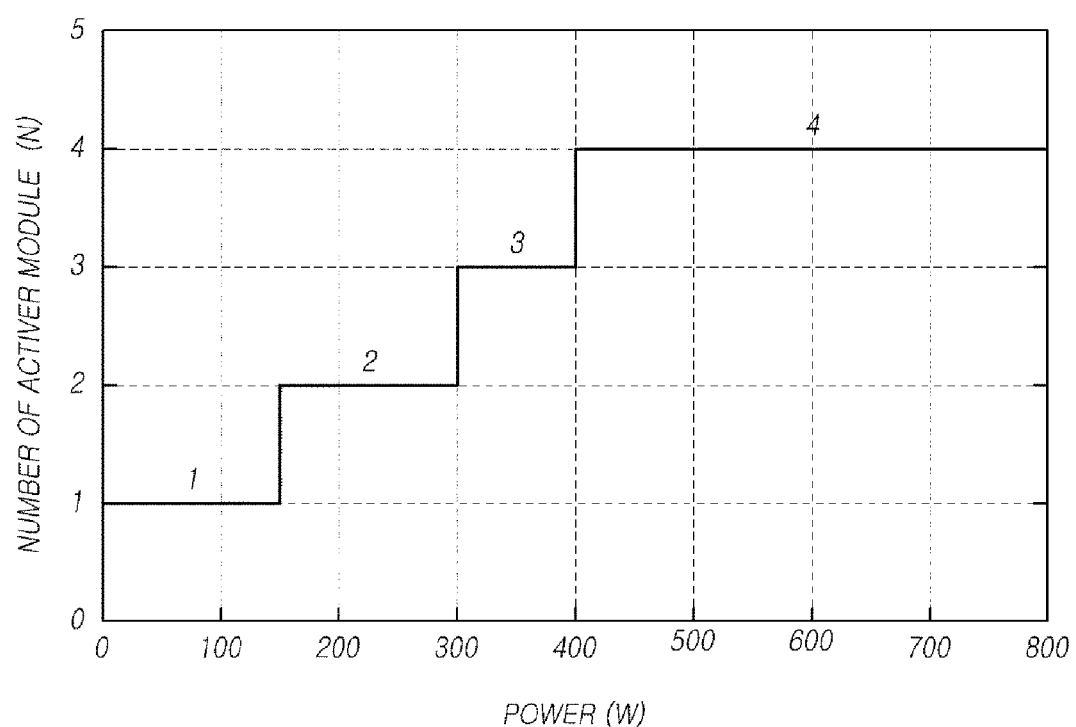
FIG. 3 is a graph showing an example of an efficiency map stored in a memory of FIG. 2.

FIG. 3 is a graph showing an example of an efficiency map stored in the memory of FIG. 2.

In FIG. 3, a horizontal axis represents power processed by the converter system 200. Further, a vertical axis represents the number of converter modules which creates optimum efficiency for each of the processing power.

Referring to FIG. 3, when the converter system 200 processes power of 100 W, the number of converter modules which create optimum efficiency is 1. When the converter system 200 processes power of 200 W, the number of converter modules which creates optimum efficiency is 2. In the graph of FIG. 3, a boundary part may be understood as having a value of a previous state. For example, when processing power is 300 W in the graph, the number of converter modules may be 2 or 3. In this case, if the number of converter modules was 2 in a previous state, the converter system 200 continuously maintains the number of converter modules as 2. In contrast, if the number of converter modules was 3 in a previous state, the converter system 200 continuously maintains the number of converter modules as 3.

Such an efficiency map can be acquired through an experiment. For example, an engineer first configures processing power as 100 W, 200 W, . . . , 800 W and the like and may find the number of converter modules which creates maximum efficiency while changing the number of converter modules. The efficiency map may be determined according to values acquired through the experiment.

The efficiency map may be acquired through calculation or modeling. For example, when there is a loss model of the converter module, the number of converter modules which generates a minimum loss in each of the processing power may be found using the loss model. The efficiency map may be determined according to a value acquired through the calculation.

Meanwhile, in FIG. 3, one axis of the efficiency map is represented by processing power and the other axis is represented by the number of converter modules, but they are represented by other values in the efficiency map.

For example, one axis of the efficiency map may be represented by input power. Since the processing power of the converter system 200 is proportional to the input power, the input power may be used as an index which replaces the processing power.

As a result, the efficiency map may be understood as mapping of first parameters corresponding to the processing power and second parameters corresponding to the number of converter modules which can process the processing power with the optimum efficiency. Here, the first parameter may be the processing power or the input power. Alternatively, the first parameter may be input current amounts. When a voltage is constant, since the input power is determined according to the input current amounts, the input current amounts may be used as an index corresponding to the processing power.

The controller 220 may control the converter modules 230 by using the efficiency map.

Referring back to FIG. 2, the controller 220 may acquire a sensing value of input power or output power to configure a first parameter value corresponding to the processing power.

A power sensor 261 may be located at the input terminal of the converter system 200. The converter system 200 may acquire input power (Pin), input current (Iin), input voltage (Vin) or the like by using the power sensor 261 of the input terminal.

Further, a power sensor 262 may also be located at the output terminal of the converter system 200. The converter system 200 may acquire output power (Po), output current (Io), output voltage (Vo) or the like by using the power sensor 262 of the output terminal.

When the first parameter value is the input current, the converter system 200 may configure the input current (Iin) acquired from the power sensor 261 as the first parameter value.

When the first parameter value is the output power, the converter system 262 may calculate an output power value by multiplying the output current (Io) and the output voltage (Vo) acquired from the power sensor 262 and configure the output power value as the first parameter value.

When the first parameter value is configured, the controller 220 may calculate a second parameter value (for example, a value corresponding to the number of converter modules) by substituting the first parameter value into the efficiency map.

The controller 220 may select the number of converter modules corresponding to the calculated second parameter value as active converter modules and process processing power of the converter system 200 by using the active converter modules.

Meanwhile, a state in which the second parameter value is changed may be defined as a transient state. At this time, the controller 220 may control the output power of the active control module to gradually increase or decrease.

The controller 220 may transmit a reference signal to the converter module 230 and the converter module 230 may control output power according to the reference signal. At this time, the controller 220 may control the output power of the active converter module to gradually increase or decrease by increasing or decreasing the reference signal in the transient state.

Further, the controller 220 includes a digital filter or an analog filter and may transmit the reference signal to the converter modules via the digital filter or the analog filter. At this time, the digital filter or the analog filter may be a lowpass filter and a filter band may correspond to a frequency range lower than a current control cutoff frequency of the converter modules.

In addition, the controller 220 may further include a Digital to Analog Converter (DAC) which converts a digital signal for the reference signal to an analog signal and transmit the reference signal via a digital filter located at a DAC front end or an analog filter located at a DAC rear end.

Meanwhile, the efficiency map may be stored in the form of a function having the first parameter as an input and the second parameter as an output. At this time, the controller 220 may calculate a second parameter value by substituting a first parameter value into the function.

The efficiency map may be stored in the form of a table having the first parameter as a first group and the second parameter as a second group. At this time, the controller 220 may calculate the second parameter value by using interpolation with respect to a value which is not listed in the first group.

When the second parameter value is calculated, the controller 220 may operate the number of converter modules corresponding to the second parameter value among the converter modules.

The controller 220 may select the number of converter modules corresponding to the second parameter value from the converter modules and transmit enable signals Ena_1, Ena_2, . . . Ena_n) to the selected converter modules. Further, the controller 220 may transmit disable signals (not shown) to converter modules which are not selected.

Each of the converter modules 230 may or may not perform power conversion by using the enable signals (Ena_1, Ena_2, . . . Ena_n) or the disable signals (not shown).

Meanwhile, the converter modules 230 may be current control type converters. The controller 220 may transmit current reference values (Iref_1, Iref_2, . . . Iref_n) to the current control type converter modules 230. At this time, each of the converter modules 230 controls currents according to the received current reference values (Iref_1, Iref_2, . . . Iref_n).

The controller 220 may selectively operate the converter modules 230 by using the current reference values. For example, the controller 220 may select the number of converter modules corresponding to the second parameter value from the converter modules and transmit a current reference value corresponding to 0 Ampere (A) to converter modules which are not selected, so as not to operate the corresponding converter modules.

Figure 4:
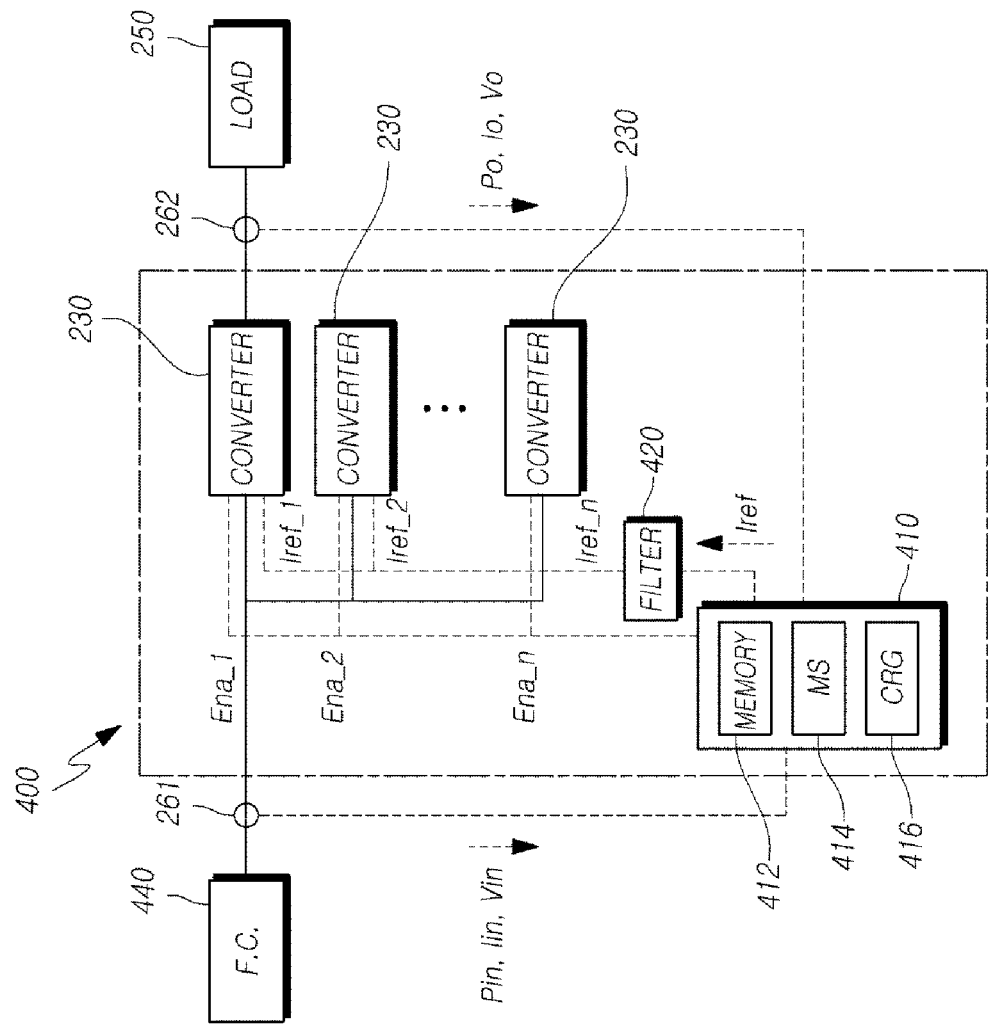
FIG. 4 illustrates a converter system according to another embodiment of the present invention.

FIG. 4 illustrates a converter system according to another embodiment of the present invention.

Referring to FIG. 4, a converter system 400 includes a plurality of current control type converter modules 230 connected in parallel to an output terminal of a fuel cell 440.

Further, the converter system 400 may include a digital controller 410 and a filter 420.

The digital controller 410 may include a memory 412, a module selector 414, and a reference value generator 416.

The memory 412 may store the efficiency map in which first parameters corresponding to processing power of the converter system and second parameters corresponding to the number of converter modules which can process the processing power with the optimum efficiency are mapped.

The module selector 414 may configure a first parameter value according to a sensing value of input power or output power and calculate a second parameter value by substituting the first parameter value into the efficiency map. The module selector 414 may select the number of converter modules corresponding to the second parameter value as active converter modules from the converter modules and transmit enable signals Ena_1, Ena_2, . . . Ena_n) to the selected active converter modules.

The reference value generator 416 may generate current reference value signals for some or all of the converter modules. For example, the reference value generator 416 may generate current reference value signals only for the active converter modules.

Figure 5:
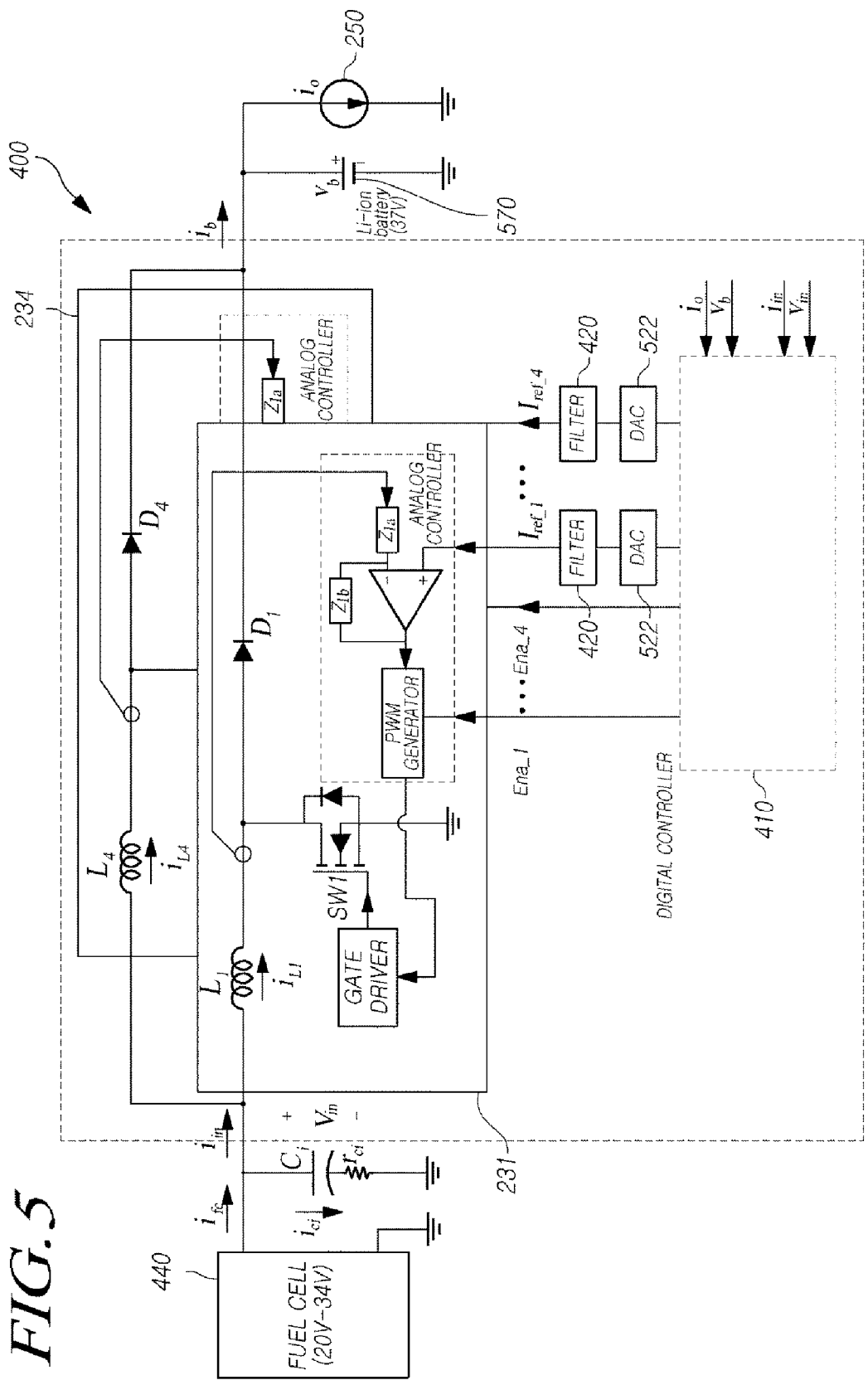
FIG. 5 illustrates a circuit model of the embodiment of FIG. 4.

FIG. 5 illustrates a circuit model according to the embodiment of FIG. 4.

Referring to FIG. 5, the converter system 400 includes four converter modules. Here, a first converter module 231 and a fourth converter module 234 may be understood as examples of the converter modules 230 illustrated in FIG. 4.

In the embodiment of FIG. 5, the converter system 400 has a DC/DC boost converter as a converter module for a non-isolated power conversion in a condition where an input voltage is lower than an output voltage.

More specifically, referring to FIG. 5, the first converter module 231 corresponds to a DC/DC boost converter including an inductor (L1) located at an input terminal line, a first switch (SW1) located at a ground terminal line, and a diode (D1) located at an output terminal line. Although not illustrated in FIG. 5 in detail, the remaining three converter modules may be all DC/DC boost converters.

The DC/DC boost converter has the same input current as a current (iL1) of the inductor (L1) and has an advantage in that an accurate control of an input current is possible when the current is controlled by a Pulse Width Modulation (PWM) method like the first converter module 231. The fuel cell 440 is required to perform accurate current control to prevent damage of the stack, so that the converter system 400 uses the DC/DC boost converter as the converter module.

Further, the DC/DC boost converter has a feature of relatively easily increasing processing power and decreasing current ripple when modules having the same capacity are arranged in parallel in an interleaving type. In this respect, the converter system 400 operates a plurality of converter modules in parallel.

Meanwhile, referring to FIG. 5, a battery 570 may be connected to the output terminal of the converter system 400. The stack may be damaged due to a rapid change in the output of the fuel cell 440. As illustrated in FIG. 5, when the battery 570 is connected between the output terminal of the converter system 400 and the load 250, the battery 570 may cover the rapid change in a load current (io) and thus totally stabilize the system.

Referring to FIG. 5, the digital controller 410 receives an input current (iin), an input voltage (vin), an output current (io), and a battery voltage (vb) as sensing values. Here, since the output voltage of the converter system 400 is fixed to the battery voltage (vb), the battery voltage (vb) may be actually understood as the output voltage of the converter system 400.

In the efficiency map, the first parameter may be an input current or input power. When the first parameter is the input power, the digital controller 410 may configure the first parameter value according to the product of a current value (iin) and a voltage value (vin) of the input power.

Referring to FIG. 5, the digital controller 410 transmits enable signals (Ena_1, . . . Ena_4) and current reference value signals (Iref_1, . . . Iref_4) as output signals. At this time, a Digital to Analog Converter (DAC) 522 that converts a digital output signal of a reference value generator 416 to an analog signal and a filter 420 are located at a current reference value signal output terminal.

The filter 420 may be an analog filter or a digital filter. When the filter 420 is an analog filter, the filter 420 is located at a rear end of the DAC 522 as illustrated in FIG. 5. When the filter 420 is a digital filter, the filter 420 may be located at a front end of the DAC 522.

Figure 6A:
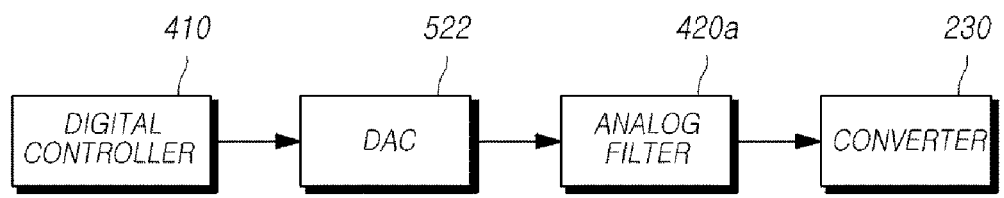
FIGS. 6A and 6B illustrate an embodiment of the location of a filter.
Figure 6B:
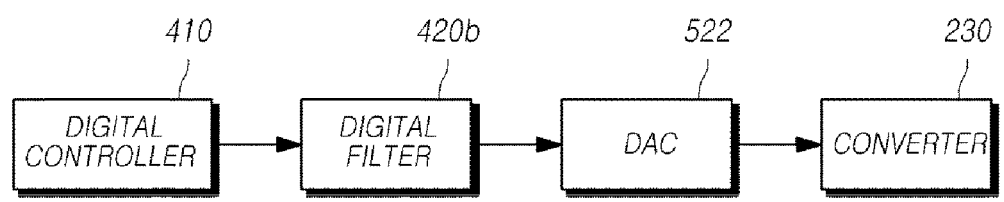

FIGS. 6A and 6B illustrate an embodiment of the location of the filter.

Referring to FIG. 6A, when the filter is an analog filter 420a, the filter is located between the DAC 522 and the converter module 230. At this time, a current reference value signal (digital signal) output from the digital controller 410 is converted into an analog signal by the DAC 522 and then output. Further, the analog signal is filtered through the analog filter 420a and then finally transmitted to the converter module 230.

Referring to FIG. 6B, when the filter is a digital filter 420b, the filter is located between the digital controller 410 and the DAC 522. At this time, a current reference value signal (digital signal) output from the digital controller 410 is filtered through the digital filter 420b and then transmitted to the DAC 522. The DAC 522 converts the filtered digital signal to an analog signal and finally transmits the analog signal to the converter module 230. Meanwhile, the digital filter 420b may be implemented in a digital processor which is the same as the reference value generator 416.

Figure 7A:
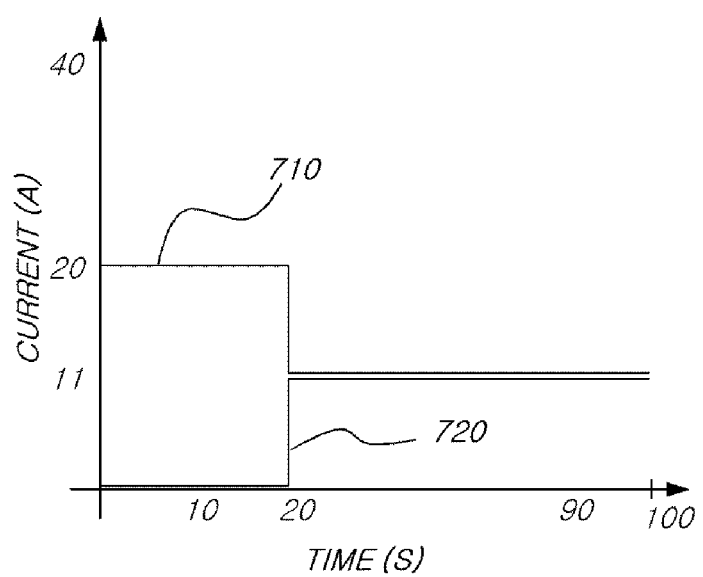
FIGS. 7A to 7C are views for describing roles of a filter.
Figure 7B:
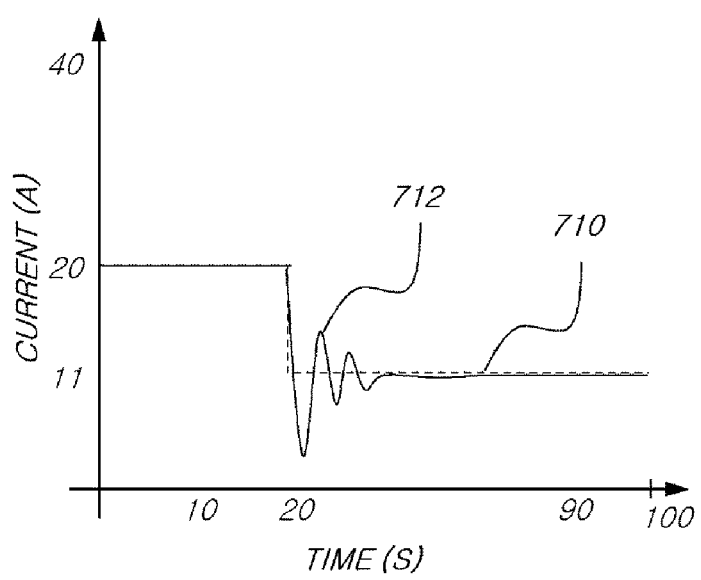
Figure 7C:
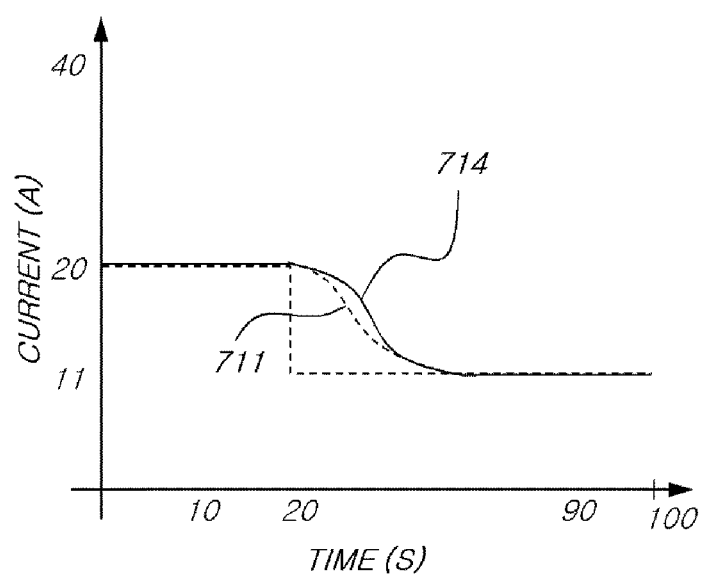

FIGS. 7A to 7C are views for describing roles of the filter.

The converter system 400 may change the number of converter modules to be operated according to processing power. For example, in a state where the processing power is 200 W (current of 20 A), the converter system 400 may operate one converter module (for example, the first converter module 231). Then, when the processing power increases to be 220 W (current of 22 A), the converter system 400 may operate two converter modules (for example, the first converter module 231 and the fourth converter module 234).

FIG. 7A shows a current reference value transmitted to each of the converter modules 231 and 234 in the moment (20 second position) when the processing is changed from 200 W to 220 W. In FIG. 7A, a line 710 shown on the left indicates a current reference value transmitted to the first converter module 231 and a line 720 shown on the bottom indicates a current reference value transmitted to the fourth converter module 234.

Referring to FIG. 7A, the converter system 400 transmits a current reference value of 20 A to the first converter module 231 and a current reference value of 0 A to the fourth converter module 234 by the 20 second position. However, after the 20 second position, the converter system 400 transmits a current reference value of 11 A to the first converter module 231 and also a current reference value of 11 A to the fourth converter module 234 according to a change in the processing power. Since the converter system 400 operates converter modules in parallel in an interleaving type, the converter system 400 transmits the same current reference vale to the converter modules operating in parallel.

FIG. 7B illustrates an output current of the first converter module 231. Specifically, in FIG. 7B, a solid line 712 indicates an output current of the first converter module 231 and a dotted line 710 indicates a current reference value transmitted to the first converter module 231.

Referring to FIG. 7B, oscillation occurs in a 20 second position of the output current curved line 712. The oscillation occurs due to a rapid change in the current reference value.

The converter module has a predetermined control bandwidth. When a signal beyond the control bandwidth is input, the oscillation may occur in the output current as illustrated in FIG. 7B.

In order not to generate the oscillation, the converter system 400 includes the filter 420 that filters a current reference value signal. The filter 420 may be a lowpass filter. A filter band corresponds to a frequency range lower than a current control cutoff frequency of the converter module.

FIG. 7C illustrates an output current of the first converter module 231 when the filter is used. Specifically, in FIG. 7C, a solid line 714 indicates an output current of the first converter module 231 and a dotted line 711 indicates a current reference value transmitted to the first converter module 231.

Referring to FIG. 7C, a current reference value signal is filtered by the filter 420 and expressed by a soft curved line. As described above, the filter band may correspond to a frequency range lower than the control band. Accordingly, the filtered current reference value signal has a frequency characteristic lower than the control band of the converter module. When the frequency characteristic of the current reference value signal is within the control band, oscillation does not occur in the output current curved line 714 as illustrated in FIG. 7C.

Meanwhile, the reference value generator 416 may generate a current reference value for each of the converter modules 230 according to equation (1).

$$I_{ref\_i}(n) = \begin{cases} e_i(n)\left(I_{ref\_i}(n-1) + \dfrac{\Delta i_r}{\alpha(n)}\right), & \text{if } \alpha(n) = \alpha(n-1) \\ \dfrac{e_i(n)}{\alpha(n)}\left(\sum_{i=1}^{r} I_{ref\_i}(n-1) + \Delta i_r\right), & \text{if } \alpha(n) \neq \alpha(n-1) \end{cases} \quad (1)$$

In equation (1), n denotes time, i denotes a converter module number, a denotes the number of converter modules to be operated, $\Delta i_r$ denotes a difference between an input current (iin) and an output current (io), and r denotes the total number of converter modules. Further, $e_i(n)$ has a value of 1 with respect to the converter module to be operated with an ON/OFF value of an $i^{th}$ converter module in time of n and has a value of 0 with respect to the remaining converter modules.

Equation (1) is applied when the input power becomes the same as the load power. When the number of modules is changed according to the efficiency map, an initial current reference value in the change time is determined by comparing the number of current operating modules and the number of previous operating modules in order to restrain a rapid change in the input current.

Figure 8:
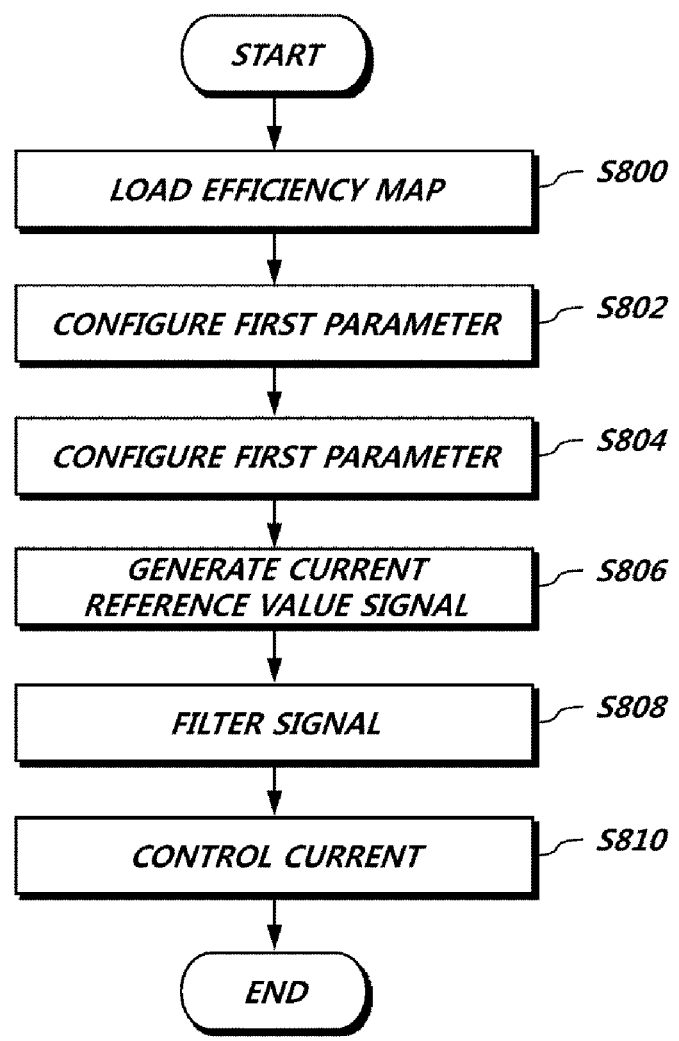
FIG. 8 is a flowchart illustrating a process of a control of a converter system according to another embodiment of the present invention.

FIG. 8 is a flowchart illustrating a process of a control of the converter system according to another embodiment of the present invention.

Referring to FIG. 8, the converter system 400 loads, to a memory, an efficiency map in which first parameters corresponding to processing power and second parameters corresponding to the number of converter modules which can process the processing power with the optimum efficiency are mapped in step S800.

Further, the converter system 400 configures a first parameter value according to a sensing value for input power or output power in step S802.

When the first parameter value is configured, the converter system 400 calculates a second parameter value by substituting the first parameter value into the efficiency map, selects the number of converter modules corresponding to the second parameter value as active converter modules from the converter modules, and transmits enable signals in step S804.

The converter system 400 generates current reference value signals for some or all of the converter modules in step S806, and filters the current reference value signals and transmits the filtered current reference value signals to the converter modules in step S808.

Further, the converter system 400 controls currents of the converter modules according to the current reference value signals in step S810.

Figure 9:
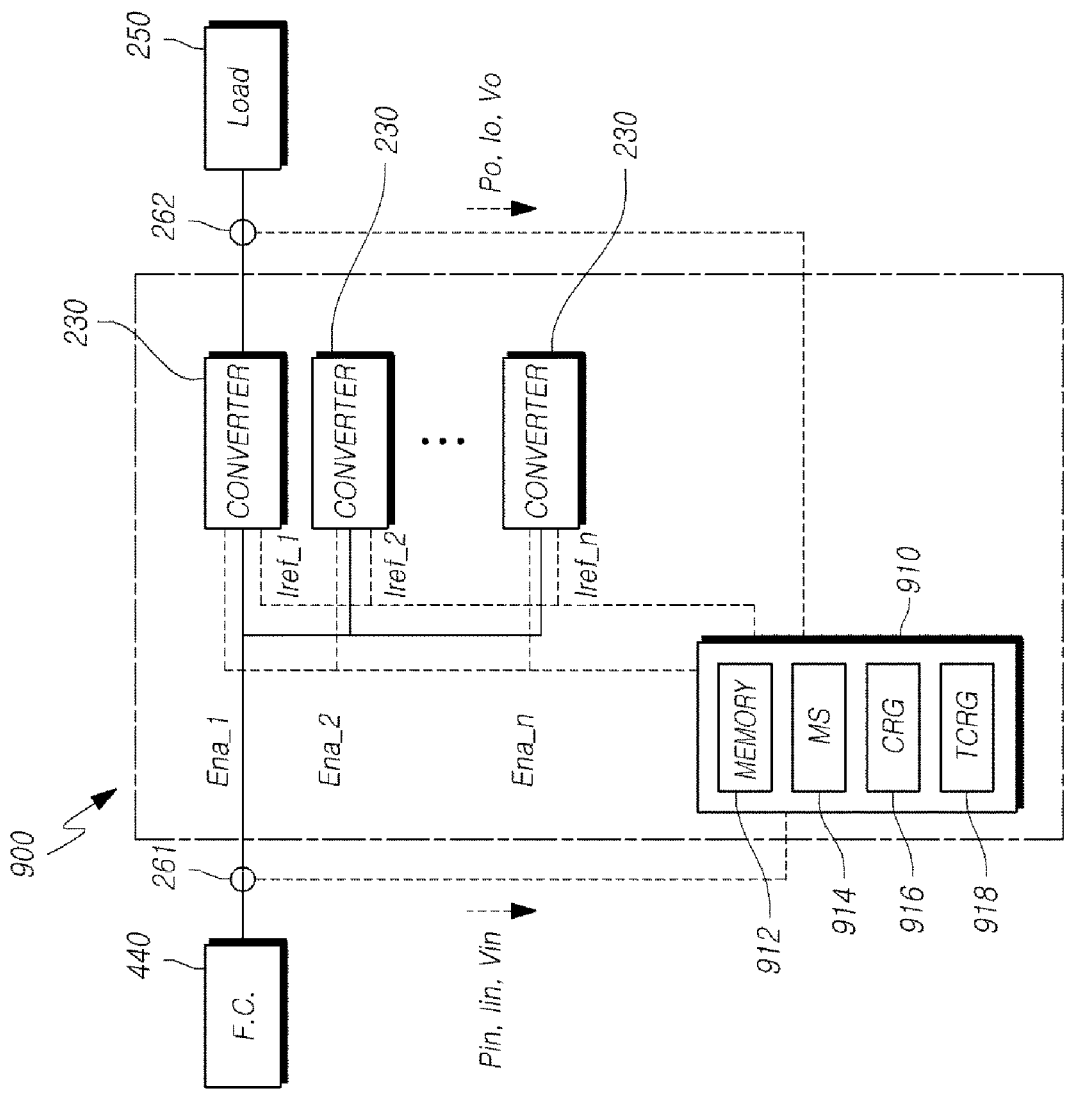
FIG. 9 illustrates a converter system according to another embodiment of the present invention.

FIG. 9 illustrates a converter system according to another embodiment of the present invention.

Referring to FIG. 9, a converter system 900 includes a plurality of current control type converter modules 230 connected in parallel to an output terminal of a fuel cell 440.

Further, the converter system 900 may include a digital controller 910.

The digital controller 910 may include a memory 912, a module selector 914, a reference value generator 916, and a total reference value generator 918.

The memory 912 may store the efficiency map in which first parameters corresponding to processing power of the converter system and second parameters corresponding to the number of converter modules which can process the processing power with the optimum efficiency are mapped.

The total reference value generator 918 generates a command-value-for-total-current-reference-value and the reference value generator 916 generates current reference value signals (Iref_1, Iref_2, . . . Iref_n) for the respective converter modules 230. However, the sum total of current reference values of the converter modules 230 is the same as the command-value-for-total-current-reference-value generated by the total reference value generator 918.

The module selector 914 configures a first parameter value according to the command-value-for-total-current-reference-value. Further, the module selector 914 calculates a second parameter value by substituting the first parameter value into the efficiency map. The module selector 914 may select the number of converter modules corresponding to the second parameter value as active converter modules from the converter modules and transmit enable signals Ena_1, Ena_2, . . . Ena_n).

Meanwhile, the total reference value generator 918 may control a change rate of the command-value-for-total-current-reference-value within a preset total command value change rate range.

The stack may be damaged due to a rapid change in the output of the fuel cell 440. The total reference value generator 918 may control the change rate of the command-value-for-total-current-reference-value within a preset range in order to prevent the rapid output change. The range may vary depending on characteristics of the fuel cell 440. Further, a value of the range may be transmitted to the total reference value generator 918 according to a user's control.

Figure 10A:
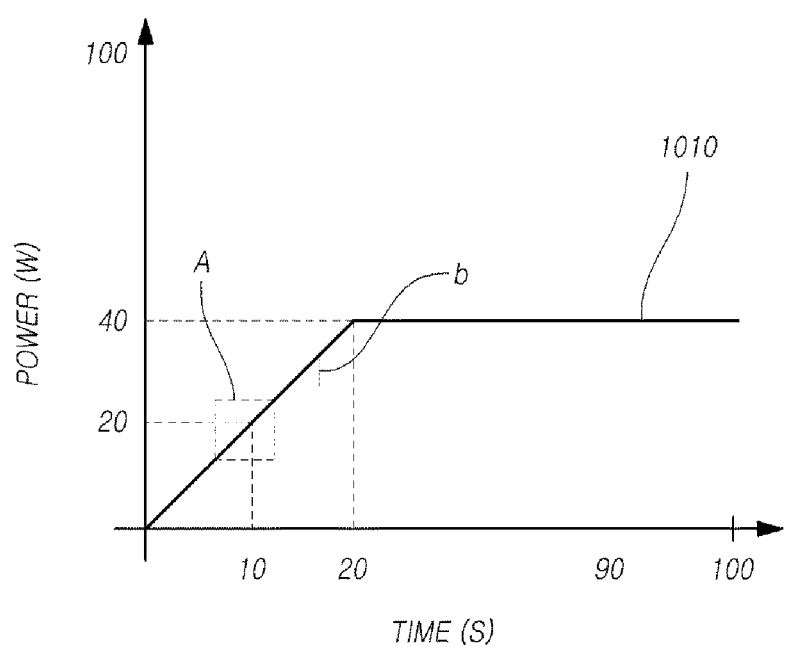
FIGS. 10A and 10B illustrate outputs of a fuel cell and converter modules.
Figure 10B:
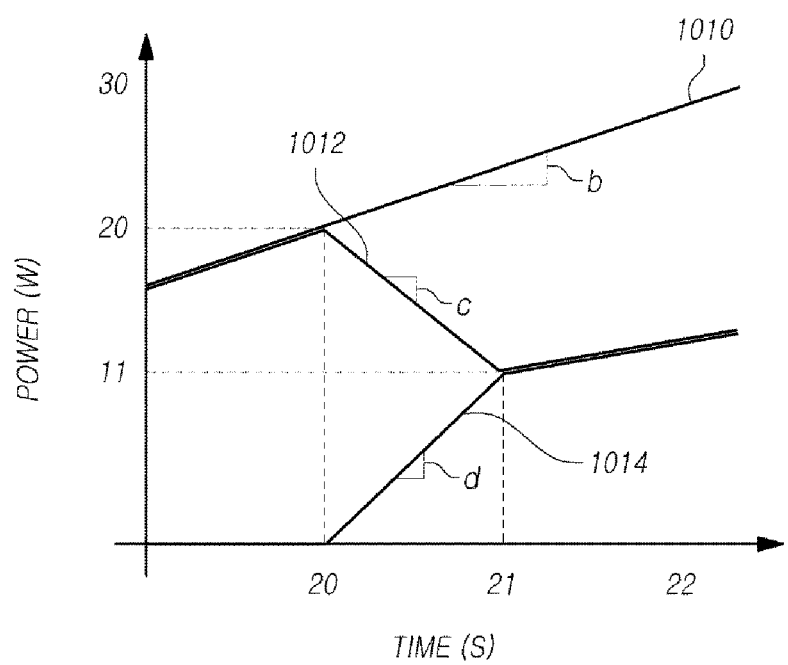

FIGS. 10A and 10B illustrate outputs of the fuel cell and converter modules. Specifically, FIG. 10A shows a curved line 1010 of the output of the fuel cell 440 from the beginning to the entry into a normal state. Further, FIG. 10 illustrates an expansion of part A of FIG. 10A and further shows an output curved line 1012 of the first converter module 231 and an output curved line 1014 of the second converter module 232 as well as the output curved line of the fuel cell 440.

Referring to FIG. 10A, the output of the fuel cell 440 gradually increases at an incline of b (2 W/s). The incline b is determined according to a change rate of the command-value-for-total-current-reference-value generated by the total reference value generator 918.

Meanwhile, as illustrated in FIG. 10A, the total reference value generator may increase the command-value-for-total-current-reference-value until the output of the fuel cell 440 becomes a normal state. However, since the module selector 914 may configure a first parameter value according to the command-value-for-total-current-reference-value and selects the predetermined number of active converter modules by substituting the first parameter value into the efficiency map, if the command-value-for-total-current-reference-value increases, the number of active converter modules may change at one time point.

Referring to FIG. 10B, the number of active converter modules changes in a 20 second time position.

Processing power of the converter system 900 is 20 W before the 20 second time position, but processing power of the converter system 900 is 22 W in a 21 second time position. Accordingly, the module selector 914 processes power by using the first converter module 231 before 20 seconds and processes power by using both the first converter module 231 and the second converter module 232 after 20 seconds.

When the number of active converter modules changes, the converter system 900 may control the processing power of the converter modules to be uniformly distributed. For example, the processing power of the converter system 900 at a 21 second time position is 22 W in FIG. 10B. At this time, the converter system 900 may uniformly distribute the processing power and control each of the first converter module 231 and the second converter module 232 to process power of 11 W.

However, when the number of active converter modules changes, if such a control (uniformly distributing processing power to converter modules) is made, the output of each converter module rapidly changes and the oscillation described with reference to FIG. 7 may occur in each converter module.

For example, when such a control (uniformly distributing processing power to converter modules) is made at the 20 second time position in FIG. 10B, the output of the first converter module 231 rapidly decreases from 20 W to 10 W and the output of the second converter module 232 rapidly increases from 0 W to 10 W, so that the oscillation may occur in each of the converter modules. The oscillation may influence the output of the fuel cell 440.

The reference value generator 916 may control a change rate of the current reference value within a preset current reference value change rate range. Accordingly, the reference value generator 916 may prevent the output of each converter module from rapidly changing.

Referring to FIG. 10B, the module selector 914 increases the number of active converter modules from one to two according to the increase in the processing power. At this time, the reference value generator 916 controls a change rate of the current reference value (see reference numerals c and d in FIG. 10B) within a preset range such that the output of each converter module can gradually change.

The preset current reference value change rate range may be a range determined by a current control cutoff frequency of the converter modules. For example, the frequency of the current reference value change rate may be lower than the current control cutoff frequency of the converter modules 230. When the frequency of the current reference value change rate is controlled to be lower than the current control cutoff frequency, the converter modules 230 may emit the stable output regardless of the change in the current reference value.

Meanwhile, the sum total of current reference value change rates of the converter modules may be the same as the change rate of the command-value-for-total-current-reference-value. For example, in FIG. 10B, an equation of b=c+d may be established. When the sum total of the current reference value change rates of the converter modules is the same as the change rate of the command-value-for-total-current-reference-value, the converter system 900 may maintain the change rate of the output of the fuel cell 440 in a predetermined value.

Meanwhile, when the total reference value generator 918 limits the change rate of the command-value-for-total-current-reference-value within a predetermined range, the converter system 900 may have a problem in that all the load currents are not supplied. In order to solve the above problem, the converter system 900 may further include batteries connected to the output terminals of the converter modules 230. The battery may perform a function of supplying the current while the converter system 900 cannot temporarily supply the current.

Figure 11:
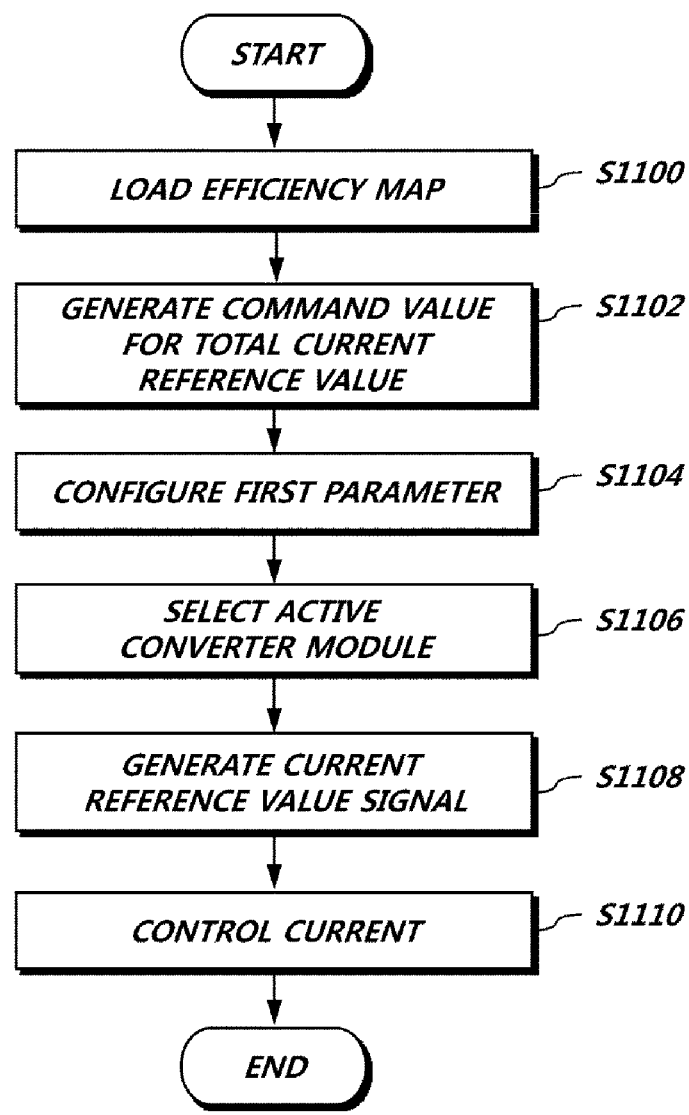
FIG. 11 is a flowchart illustrating a process of a control of a converter system according to another embodiment of the present invention.

FIG. 11 is a flowchart illustrating a process of a control of the converter system according to another embodiment of the present invention.

Referring to FIG. 11, the converter system 900 loads, to a memory, an efficiency map in which first parameters corresponding to processing power and second parameters corresponding to the number of converter modules which can process the processing power with the optimum efficiency are mapped in step S1100.

Further, the converter system 900 generates a command-value-for-total-current-reference-value in step S1102 and configures a first parameter value according to the command-value-for-total-current-reference-value in step S1104.

In addition, the converter system 900 calculates a second parameter value by substituting the first parameter value into the efficiency map, selects the number of converter modules corresponding to the second parameter value from the converter modules as active converter modules, and transmits an enable signal in step S1106.

The converter system 900 generates current reference value signals for some or all of the converter modules. At this time, the converter system 900 controls a change rate of the current reference value within a preset current reference value change rate range and controls the sum total of the current reference values to be the same as the command-value-for-total-current-reference-value in step S1108.

The converter system 900 controls currents of the converter modules by using the generated current reference value signals in step S1110.

The converter system and a method of controlling the same according to some of the embodiments of the present invention have been described.

Figure 12:
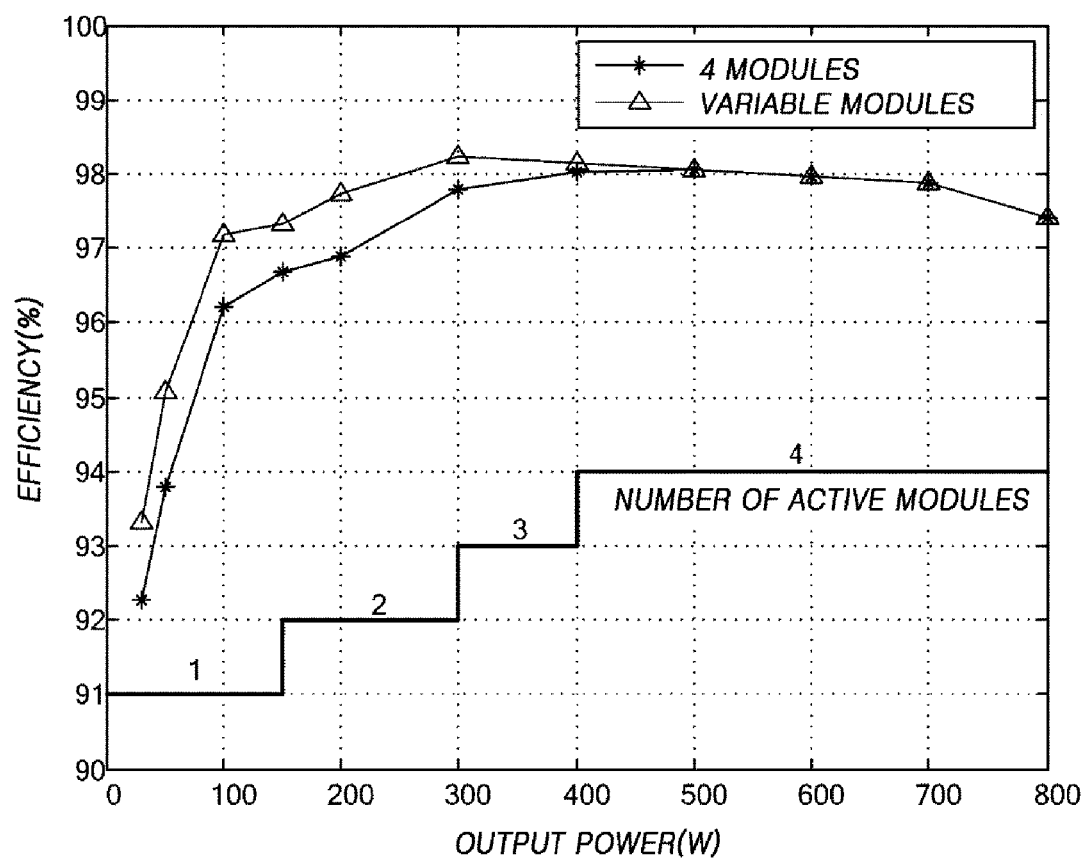
FIG. 12 illustrates an efficiency curved line of a converter system according to some of embodiments of the present invention.

FIG. 12 illustrates an efficiency curved line of the converter system according to some of the embodiments of the present invention.

In FIG. 12, a first efficiency curved line (curved line expressed by Δ) indicates the efficiency of the converter system when the number of operating converter modules is different according to processing power (first control) and a second efficiency curved line (curved line expressed by *) indicates the efficiency of the converter system when four converter modules are controlled in parallel regardless of processing power (second control).

Referring to FIG. 12, values of the first efficiency curved line (curved line expressed by A) are larger than values of the second efficiency curved line (curved line expressed by *) until processing power becomes 400 W. Above 400 W, the efficiency is the same since the four converter modules are controlled in parallel in the first control and the second control. However, the first control below 400 W has higher efficiency in comparison with the second control since the number of converter modules is controlled to have the optimum efficiency.

As described above, the converter system according to embodiments of the present invention controls the number of converter modules to create the optimum efficiency, thereby generating an effect in which a plurality of converter modules operating in parallel operate with high efficiency during entire load operation intervals.

Further, the terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are merely to not limit but describe the technical spirit of the present invention. Further, the scope of the technical spirit of the present invention is not limited by the embodiments. The scope of the present invention shall be construed on the basis of the accompanying claims in such a manner that all of the technical ideas included within the scope equivalent to the claims belong to the present invention.

What is claimed is:

1. A converter system comprising:
  a plurality of converter modules connected to one power source in parallel; and
  a controller for storing mapping information of first parameters corresponding to processing power of the converter modules and second parameters corresponding to the number of converter modules that optimally process the processing power among the converter modules, configuring a value of the first parameter according to a measurement value of power input into the converter modules or power output from the converter modules, calculating a value of the second parameter by substituting the value of the first parameter into the mapping information, selecting the number of converter modules corresponding to the value of the second parameters as active converter modules from the converter modules and processing the processing power by using the active converter modules, and controlling output power of the active converter module to gradually increase or decrease in a transient state where the value of the second parameter is changed.

2. The converter system of claim 1, wherein the controller controls the output power of the active converter module to gradually increase or decrease by transmitting a reference signal to the converter modules and increasing or decreasing the reference signal in the transient state.

3. The converter system of claim 2, wherein the controller includes a digital filter or an analog filter and transmits the reference signal to the converter modules via the digital filter or the analog filter.

4. The converter system of claim 3, wherein the digital filter or the analog filter is a lowpass filter and a filter band corresponds to a frequency range lower than a current control cutoff frequency of the converter modules.

5. The converter system of claim 3, wherein the controller further includes a Digital to Analog Converter (DAC) that converts a digital output signal for the reference signal to an analog signal and transmits the reference signal via a digital filter located at a front end of the DAC or an analog filter located at a rear end of the DAC.

6. The converter system of claim 1, wherein the converter modules are DC/DC boost converters and control currents in a Pulse Width Modulation (PWM) scheme.

7. The converter system of claim 1, wherein the controller configures the value of the first parameter according to the product of a current value and a voltage value of input power.

8. A converter system comprising:
  a plurality of converter modules connected to one power source in parallel; and
  a controller for storing mapping information of first parameters corresponding to processing power of the converter modules and second parameters corresponding to the number of converter modules that optimally process the processing power among the converter modules, configuring a value of the first parameter according to a measurement value of power input into the converter modules or power output from the converter modules, calculating a value of the second parameter by substituting the value of the first parameter into the mapping information, and transmitting a current reference value to the converter modules based on an equation of $$I_{ref\_i}(n) = \begin{cases} e_i(n)\left(I_{ref\_i}(n-1) + \dfrac{\Delta i_r}{\alpha(n)}\right), & \text{if } \alpha(n) = \alpha(n-1) \\ \dfrac{e_i(n)}{\alpha(n)}\left(\sum_{i=1}^{r} I_{ref\_i}(n-1) + \Delta i_r\right), & \text{if } \alpha(n) \neq \alpha(n-1) \end{cases}$$

(n denotes time, i denotes a number of a converter module, Iref_i(n) denotes a current reference value of an ith converter module in time of n, a denotes the number of converter modules to be operated and is determined according to the second parameter, $\Delta i_r$ denotes a difference between an input current and an output current, r denotes the number of total converter modules, and $e_i(n)$ has a value of 1 for a converter module to be operated with an ON value of the $i^{th}$ converter module in time of n).

9. A converter system connected with a fuel cell, the converter system comprising:
  a plurality of current control type converter modules connected to an output terminal of the fuel cell in parallel;
  a memory for storing an efficiency map in which first parameters corresponding to processing power of the converter system and second parameters corresponding to the number of converter modules capable of processing the processing power with an optimum efficiency are mapped;

a total reference value generator for generating a command-value-for-total-current-reference-value;

a module selector for configuring a value of the first parameter according to the command-value-for-total-current-reference-value, calculating a value of the second parameter by substituting the value of the first parameter into the efficiency map, and selecting the number of converter modules corresponding to the value of the second parameter as active converter modules from the converter modules; and a reference value generator for generating a current reference value signal for each of the converter modules, wherein a sum total of current reference values of the converter modules is equal to the command-value-for-total-current-reference-value.

10. The converter system of claim 9, wherein the reference value generator generates the current reference value signal only for at least one active converter module.

11. The converter system of claim 9, wherein a change rate of the current reference value is limited within a preset current reference value change rate range.

12. The converter system of claim 11, wherein a change rate of the command-value-for-total-current-reference-value is equal to a sum total of current reference value change rates.

13. The converter system of claim 11, wherein the preset current reference value change rate range is determined by a current control cutoff frequency of the converter modules.

14. The converter system of claim 11, wherein a change rate of the command-value-for-total-current-reference-value is limited within a preset total command value change rate range.

15. The converter system of claim 9, further comprising a battery connected to an output terminal of the converter modules.

16. The converter system of claim 9, wherein the controller selects the number of converter modules corresponding to the value of the second parameter from the converter modules and transmits enable signals to the selected converter modules.

17. The converter system of claim 9, wherein the efficiency map is stored in a form of a function having the first parameter as an input and the second parameter as an output or stored in a form of a table having the first parameter as a first group and the second parameter as a second group.

18. The converter system of claim 17, wherein the efficiency map is stored in the form of the table and the controller calculates the value of the second parameter by using interpolation with respect to a value which is not listed in the first group.

* * * * *